United States Patent [19]

Worst

[11] Patent Number: 4,489,242
[45] Date of Patent: Dec. 18, 1984

[54] STORED POWER SYSTEM FOR VEHICLE ACCESSORIES

[76] Inventor: Marc T. Worst, 4 Rue Suffren Reymond, Principauté de, Monaco

[21] Appl. No.: 436,296

[22] Filed: Oct. 25, 1982

Related U.S. Application Data

[63] Continuation-in-part of Ser. No. 227,503, Jan. 22, 1981, abandoned.

[51] Int. Cl.³ .............................................. B60L 1/00
[52] U.S. Cl. ..................................... 307/10 R; 307/65; 180/65.1; 123/41.46
[58] Field of Search .................. 307/10 R, 10 BP, 64, 307/65, 66, 100, 9; 180/65 R; 123/41.46

[56] References Cited

U.S. PATENT DOCUMENTS

| | | | |
|---|---|---|---|
| 2,075,085 | 3/1937 | Patton | 180/53 |
| 2,903,083 | 9/1959 | Kelley | 180/53 |
| 3,530,356 | 9/1970 | Aronson | 320/61 |
| 3,666,961 | 5/1979 | Bogue et al. | 307/65 |
| 3,710,884 | 1/1973 | Piech | 180/54 R |
| 3,880,250 | 4/1975 | Emanuele | 180/65 R |
| 4,156,407 | 5/1979 | Moll et al. | 123/41.46 X |
| 4,262,212 | 4/1981 | Jacob et al. | 307/65 X |
| 4,300,088 | 11/1981 | Hicks | 320/61 |

OTHER PUBLICATIONS

Ai Research Manufacturing Co. of Arizona, "Study on Reductions of Automotive Accessory Power Requirements", Dept. of Energy, Oct. 20, 1980.

Primary Examiner—E. A. Goldberg
Assistant Examiner—Todd E. DeBoer
Attorney, Agent, or Firm—Flehr, Hohbach, Test, Albritton & Herbert

[57] ABSTRACT

A stored electric power system selectively operates automotive accessories independent of the motive drive force generated by the vehicle heat engine so as to reduce fuel consumption, reduce the generation of pollutants and improve the vehicle performance. The electric power system is charged from sources external to the engine drive.

27 Claims, 8 Drawing Figures

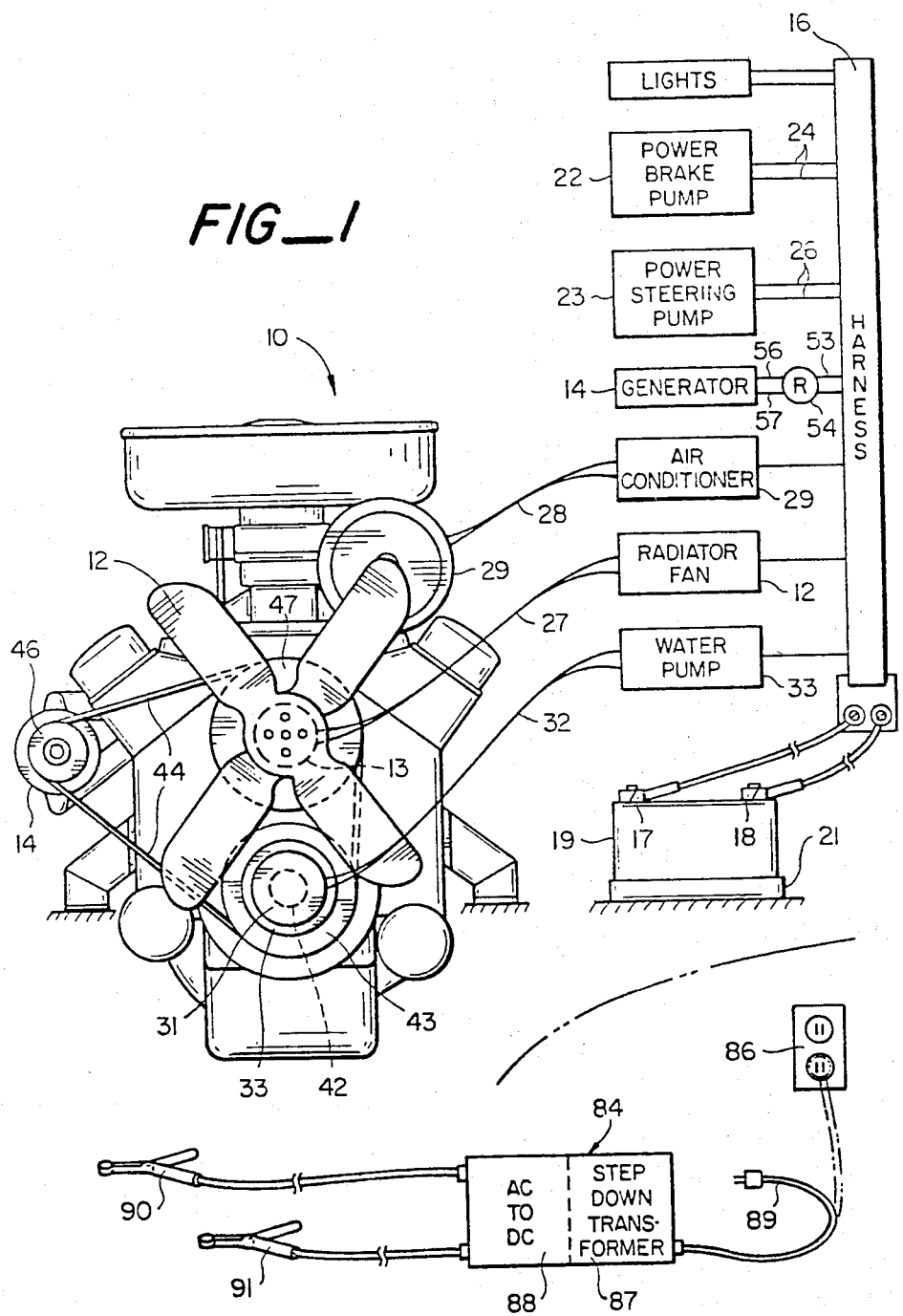

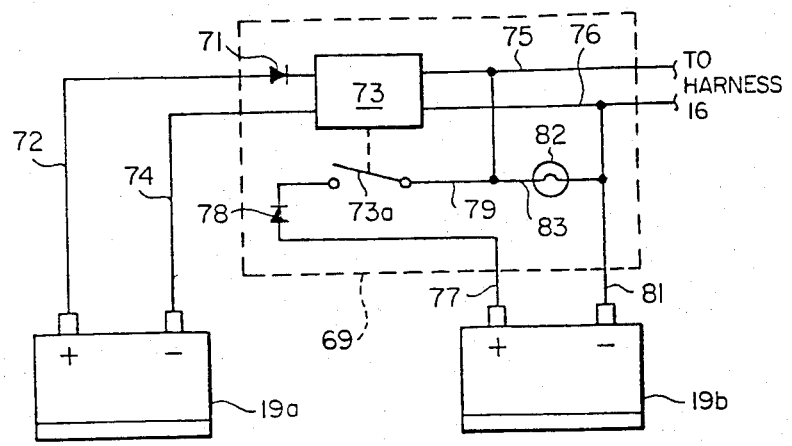
FIG_2
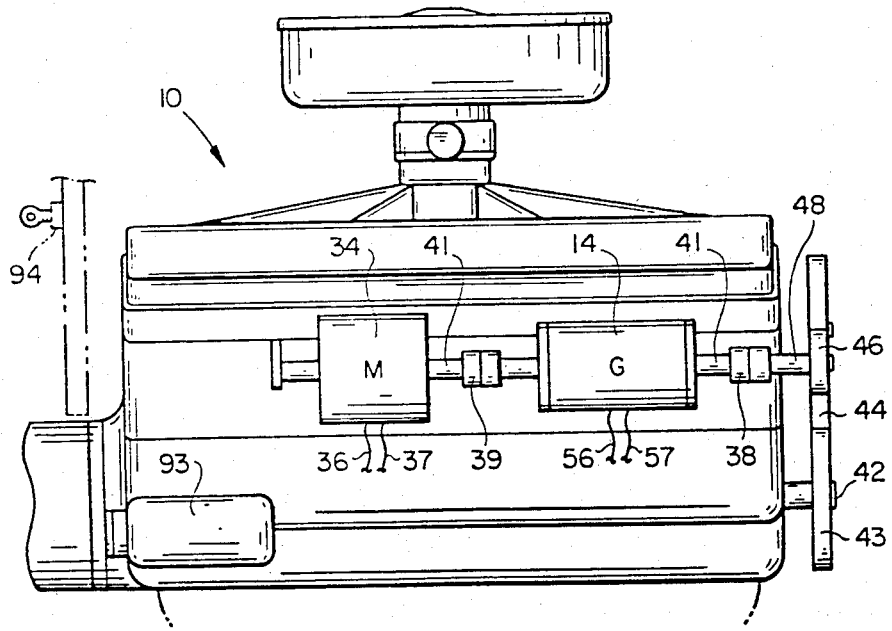
FIG_3

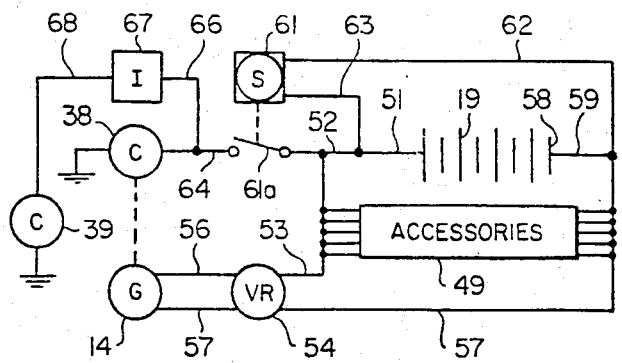
FIG_4
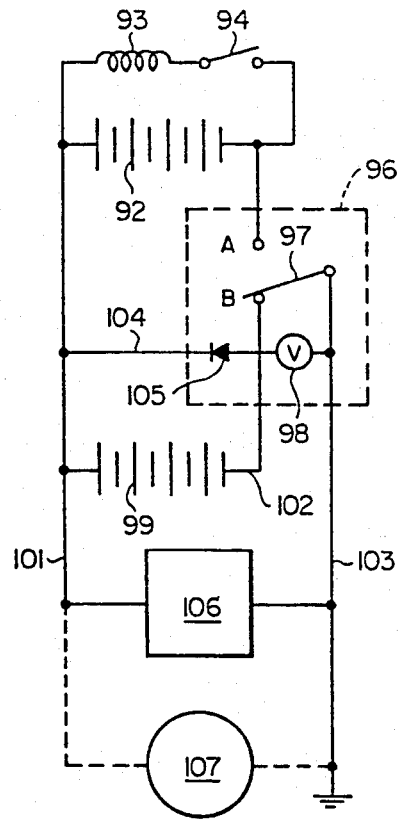
FIG_5
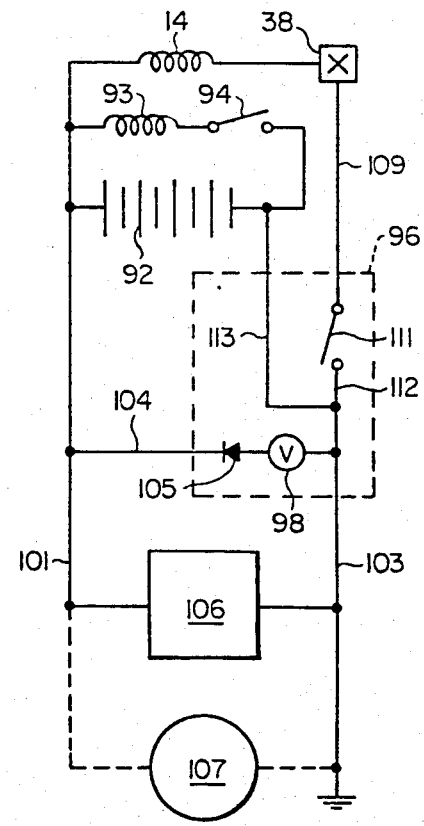
FIG_6

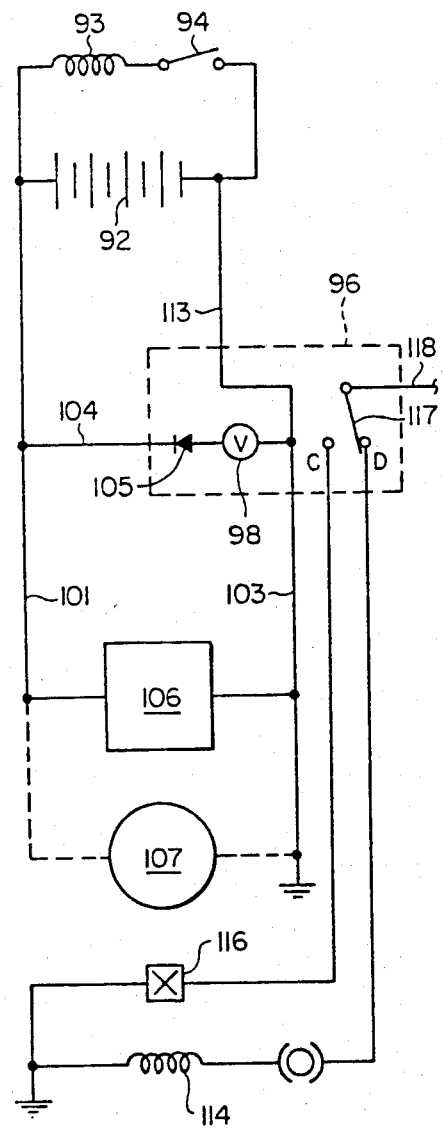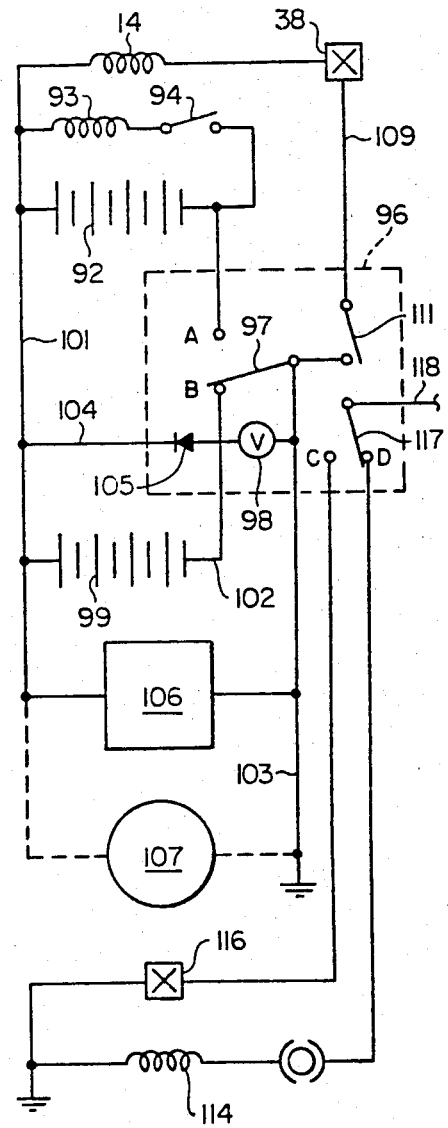
FIG_7    FIG_8

STORED POWER SYSTEM FOR VEHICLE ACCESSORIES

This is a continuation-in-part of U.S. patent application Ser. No. 227,503, filed Jan. 22, 1981 now abandoned.

This invention pertains to land vehicles of a type having accessories which heretofore have been driven by the vehicle's fuel powered vehicle drive engine or turbine which supplies the motive power, or by an onboard fuel powered auxiliary power unit (APU), or by an exhaust gas turbine (EGT). More particularly, this invention pertains to a system for relieving substantially all of the load of the accessories from these drives, while transferring such loads to power sources external of the vehicle, i.e., not supplied by operation of such drives.

Presently automotive vehicle accessories are powered either directly or indirectly from the engine which supplies the motive power. Accessories such as power steering and power brakes are powered by pumps driven by the engine. Accessories such as air conditioner compressors and water pumps are driven directly by the engine. Electrically powered accessories are powered by batteries which are charged by a generator driven by the engine. Trucks and tractors may include additional major accessories such as refrigeration units for the trucks and/or associated trailers, sometimes driven by APU's. Exhaust gas turbines may drive superchargers. All such accessories require power and, therefore, increase the onboard fuel consumption and pollution. This, of course, reduces the mileage provided for a given unit of fuel. Such accessory power usage often reduces the vehicle performance by reducing delivered power and, therefore, speed, acceleration, etc.

The system as disclosed herein is intended to reduce fuel consumption and pollution, and improve vehicle performance. Accordingly, as disclosed herein, a passenger or other type of land vehicle has been provided wherein all of the drive power comes from a fueled engine while one or more of the accessories associated with the vehicle are driven by storage batteries charged primarily from sources independent of, or external to, the operation of the vehicle drive engine. Accordingly, suitable means have been provided for taking power from the electrical utility system, as from a wall outlet, and using said electrical power for recharging the battery of the vehicle, preferably most economically during periods of low utility power usage. The battery may also obtain some or all of its charge from solar cells, thermoelectric units heated by the exhaust gases, regenerative braking and exhaust gas turbine generators.

As described above, vehicle engines presently are required to provide not only the motive power and to drive the vehicle wheels, but also power a number of accessories. By requiring such an internal combustion engine to power the accessories, it has been observed that from 5 to 20 percent of the engine's power, depending on conditions, is consumed in operating the accessories, thereby requiring greater fuel usage for given motive power, producing additional pollution, and reducing vehicle performance. According to the system as disclosed herein, accessory loads are removed from the engine and transferred directly to another power supply using less, if any, petroleum and producing less pollutants.

While the system described herein can be installed progressively into a vehicle, it is believed that it would be more viable to remove most, or all, of the accessory load at once, rather than to remove one such accessory at a time.

The latter would have the effect of introducing vehicle improvements significant enough to justify such conversion.

Present electrically operated or powered accessories could be unloaded quickly from the engine by disconnecting the generator from the engine. The owner may disconnect the generator by removing its driving belt; or, by means of a clutch, leaving the belt in place for driving such generator during emergencies. The vehicle manufacturer might elect to actually omit the generator, both to save its cost and weight and/or to justify that his legal mileage/pollution tests would not later be defeated by an owner reactivating a generator still installed, but merely disabled or disconnected. The manufacturer may further choose to substitute a smaller generator to provide minimal electric power for emergency use (ignition, minimum lights).

Accessories which are presently non-electrical can be removed from the engine load as fast as the manufacturer or owner desires to proceed. The manufacturer's goals in such progress would be influenced greatly by the ratio of such removal cost to the results thereof on an overall legal-production-sales basis. However, the present owner of a "gas-guzzler" vehicle, driven heavily in city traffic with a high luxury use of accessories, would have much stronger incentive for such removals to reduce fuel costs where driving in a region of high fuel prices, and/or low electricity rates, than an owner of a small, simply equipped car would have in a region of relatively inexpensive fuel, and/or high electricity rates.

Types of accessories which are driven by, and used by, the engine, include emission air pumps, radiator fans, water pumps and oil pumps. Each of these accessories can be operated individually, or in groups by electric motors, individually or mutually controlled, to keep engine fluid temperatures and/or pressures at their optimum level for engine efficiency at each different vehicle speed, outside air temperature, altitude, etc. For example, neither the radiator fan nor water pump need function much, if any, at high vehicle speed when traveling on level roads at low altitude, especially on cool or icy days. However, as presently directly driven by the engine such accessories continuously run at the same speed ratio as the engine, and thus always use the same high engine power as when each are fully required in climbing heavy grades, at low speeds, at high altitudes on hot days. In summary, electric drive of these engines accessories would conserve fuel, reduce pollution and provide more efficiently designed engine operation, as well as improving overall vehicle performance.

The pumps required for vehicle power brakes, power steering and air conditioning, which are now engine driven, can be driven by electric motors (perhaps by one common motor). Again, each accessory could be powered only as needed.

In this invention all these accessories can be driven by motor, powered directly from the battery of the vehicle. This removes those loads from the engine and adds them to the battery load, reducing fuel consumption and increasing performance. It has been observed that such a changeover can often simplify the construction and the maintenance of the vehicle engine and/or of the accessories themselves. Obviously, with such an increase in the electrical load, and with intermittent battery charging (instead of the present continuous recharging provided now by means of the engine driven generator), the battery may need more capacity than at present. Fortunately, the growing interest in all-electric vehicles has already led to improvement over the present lead-acid storage battery, particularly by zinc-nickel oxide batteries and Gulf's zinc-chloride batteries as well as the more expensive nickel-cadmium batteries used on aircraft. Further, removal of the generator may offset the increased costs of such improved batteries, and their additional weight, if any.

With the growing use of vehicles using this new system (and the growing use of all-electric vehicles) a network of battery servicing and exchange facilities can be expected to develop as a new major service business in public garages, service stations, parking lots, drive-in movies, etc. The supply of battery power will then become analagous to the supply today of gasoline or diesel fuel.

The manufacturer can install a normal battery charger, or motor-driven generator, on the vehicle with means for connecting to an external power source. If neither is installed, the vehicle owner can purchase a battery charger to carry in his vehicle. In any case, the owner can plug a cord connecting any recharging means into a power outlet at his home, garage or parking lot at work. As the servicing of batteries grows and becomes more widespread, additional outlets, either metered or included in the parking hourly/monthly fee, can be expected to become more readily available.

As their capital costs decline, a solar cell system for generating electricity, mounted on the vehicle, may become viable for partially or wholly recharging the battery. Regenerative braking (as commonly used on electric vehicles) and/or an exhaust gas turbine driven generator or an exhaust gas supplied thermoelectric unit may assist in battery charging.

To simplify the driver's use of a system of the kind described, two batteries (or two groups of batteries) can be connected to the system so that either one can be used, as manually selected by the driver from the dashboard. Or, preferably, as disclosed herein, when the battery in use falls below a minimum charge level, an automatic switch can serve to decouple the first battery and connect the accessories to the second battery. Until the "dead" first battery is replaced or recharged, an alarm light may be displayed.

As described above, buses, trucks and tractors often have air conditioners driven by their engines. Tractors and trucks (and their towed semi-trailers and trailers) may have major accessories, such as harvesters, refrigerant compressors (for freezer bodies), concrete mixing drums, etc., driven by their engines, or by APU's. Using this invention, such accessories could be driven by electric motors, powered by storage batteries, carried on the vehicles, which could be charged externally. Alternatively, when parked, these accessory motors could be powered directly by external electric sources, perhaps while the batteries are being recharged.

In general, this invention pertains to an automotive vehicle, including a heat engine or turbine for supplying the entire motive force to the vehicle. Electric storage battery means carried by the vehicle are normally herein maintained in a charged state by sources of electricity substantially independent of the operation of the vehicle. The storage battery means directly coupled to the power-operated accessories operates said accessories, substantially solely from said storage battery means, to relieve such associated load from the engine or turbine.

It is a general object of the present invention to provide an improved automotive vehicle characterized by reduced fuel consumption, reduced emission of pollutants and improved vehicle performance.

Another object of the present invention is to provide a system of the kind described in which the vehicle's accessories are substantially powered by electric storage battery means.

A further object of the present invention is to provide a system of the kind described in which the storage battery means is primarily recharged by sources external to the vehicle.

Still another object of the present invention is to provide a system of the kind described in which a plurality of storage battery means can be employed in sequence for operating the accessories of the vehicle.

Another object of the present invention to provide a system of the kind described in which a generator can be coupled to the engine for recharging a battery after it has been drained to a predetermined level, when the vehicle is used for long periods of time or during emergencies.

A further object of the present invention is to provide alternate means of driving selected electric accessories, especially when the battery is nearly discharged (in order to conserve the battery life); or, when parked (in order to use external electric power directly).

The foregoing and other objects of the invention will be more readily evident from the following detailed description of preferred embodiments when considered in conjunction with the drawings.

FIG. 1 is a diagrammatic front elevation view of an automotive internal combustion (heat) engine in which accessories are battery operated according to the invention;

FIG. 2 shows an electrical diagram of a multiple battery system including means for automatically switching from one battery to another;

FIG. 3 shows a diagrammatic side elevation of a heat engine in which an optionally-installed generator may be driven either by the engine or by an externally-powered electric motor including means for clutching the generator to the engine, or clutching the generator to the electric motor;

FIG. 4 is a diagram of a circuit for automatically controlling selected accessory components of the system shown in FIG. 3;

FIG. 5 is a circuit diagram of a multiple battery system for manually switching from one battery to another;

FIG. 6 is a circuit diagram of a system for manually switching the generator to operate from the engine drive;

FIG. 7 is a circuit diagram for manually controlling other selected accessory components of a system to operate from the engine or to operate from an externally powered electric motor; and FIG. 8 is an electrical circuit diagram combining FIGS. 5, 6 and 7 to provide manual or automatic switching of: dual batteries, generator and selected accessory drives.

The embodiments shown in FIGS. 2 thru 7 can also be combined as desired, with either manual or automatic switching means for any individual embodiments.

FIG. 1 shows an internal combustion (heat) engine assembly of the type adopted to be mounted within the engine compartment of an automotive vehicle. Engine assembly 10 includes a radiator cooling fan 12 driven by an electric motor 13 and an optionally-installed direct current generator 14 (for use under circumstances as described further below). Since the commonly used automotive alternator is an electric generator for first producing alternating and then secondly, direct current, the "generator" 14 having direct current output can be either a generator or an alternator, and the terms are used interchangeably herein.

Inasmuch as the usual automotive vehicle includes a wiring harness electrically connected to the various electrically operated accessories, the system shown in FIG. 1 includes an electric wiring harness 16 electrically coupled at its lower end to the terminals 17, 18 of an electric storage battery 19 carried upon a suitable support platform 21 within the engine compartment of the vehicle.

Battery 19, in normal operation, provides the power for operating accessories. It is contemplated that during periods of low power usage, as in the middle of the night, such batteries can be most economically recharged simply by coupling the input lead 89 of a recharging unit 84 of conventional design to a wall outlet 86. The battery charger 84 is provided with clamps such as used in "jumper" cables. Clamp 90 is adapted to be associated with the positive terminal of the battery, and 91 with its negative terminal. If charger 84 is permanently installed in the vehicle, 90 and 91 may be connected, through protective diodes, permanently to the battery circuits, via harness 16. Then, when the vehicle is parked, lead 89 can be coupled to wall outlet 86 for recharging.

The battery 19 can also be recharged by the optionally-installed generator 14, as driven either by engine 10 or by an optionally-installed electric motor 34 (when the latter is coupled to an external electric source, such as wall outlet 86) as further detailed in FIGS. 3 and 4.

Furthermore, the battery 19 can be recharged by a solar cell electric system mounted externally on the vehicle (or on a towed trailer), and connected to harness 16. Battery 19 can also be so connected for recharging to a regenerative braking system, and/or an EGT driven generator, and/or an exhaust gas heated thermoelectric unit.

A number of boxes representative of various accessories are diagrammatically coupled to wiring harness 16 with the name of a given accessory shown within the border of each box. Accordingly, it is to be understood that while a motorized power steering pump or a motorized power brake pump, for example, have not been shown in detail as they might actually appear on the engine assembly 10, the boxes 22, 23 diagrammatically represent the actual structure of such motorized pumps. Accordingly, electrical leads 24, 26 are respectively coupled between harness 16 and motorized brake pump 22 and motorized power steering pump 23, respectively.

Where it has been feasible to show the electrical connections between the wiring harness 16 and certain accessories such as the motorized radiator fan 12, electrical leads, such as leads 27, are shown providing the appropriate interconnection with fan motor 13.

Similarly, leads 28 serve to couple harness 16 to a motorized air conditioning compressor 29. An electric motor 31 connected by leads 32 operates a water pump 33.

An optionally-installed generator 14 driven by the engine 10, in one arrangement can also be driven by a motor 34 (FIG. 3) via leads 36, 37 to an external electric source, such as outlet 86, FIG. 1, to recharge battery 19.

FIG. 2 shows a dual battery system embodiment of the invention wherein a vehicle can be operated for longer periods of time than from a single battery, by first operating accessories from one battery until it is drained to a predetermined level and then automatically switching to operate the accessories from a second battery.

Batteries 19A and 19B are coupled to switch means 69. It is to be understood that in practice batteries 19A and 19B may each include a number of batteries of provide energy, with each battery perhaps driving a selected associated accessory.

The positive side of battery 19A is coupled via diode 71, poled to pass current in the direction indicated by the arrowhead portion of the diode, connected by lead 72 and to a voltage responsive switch element 73 of known design. The negative side of battery 19A also passes via lead 74, switch means 73 and along lead 76. The other output from switch element 73 travels along lead 75. So long as battery 19A retains its charge, its output is fed via output leads 75, 76 to harness 16 for operating accessories.

However, at such time as the level of charge in battery 19A drops below a predetermined minimum, sufficient to hold switch element 73a open, the switch element 73a closes and forms a circuit which introduces battery 19B to the system in a manner precluding battery 19B from wasting its charge by attempting to recharge battery 19A.

Closure of switch element 73a forms a circuit which traces from the positive side of battery 19B via lead 77, diode 78, switch element 73a, and lead 79 coupled to output lead 75. The negative side of battery 19B connects directly via lead 81 to output lead 76.

Finally, when operating on secondary battery 19B, its warning light 82 is lighted, as it is disposed between leads 79, 81. Should it be necessary, a resistance can be introduced into lead 83 to protect the light 82.

FIGS. 1, 3 and 4 shows a means for automatically coupling generator 14 to be driven by the engine 10 so as to charge battery 19, after battery 19 has been drained down to a predetermined level, so as to inhibit the draining of the battery 19 substantially below a safe level.

Engine 10 includes an output drive shaft 42 for rotating a drive pulley 43 disposed on the outer end thereof. A drive belt 44 trained about a generator drive pulley 46 and guide pulley 47 serves to rotate shaft 48 continuously. Whenever during operation of the vehicle the charge in battery 19 drops below a predetermined level, an electromagnetic clutch 38 is engaged so as to couple shaft 48 to the generator shaft 41. At the same time, if motor 34 is installed, an electromagnetic clutch 39 serves to decouple the friction-windage load of the now inactive motor 34 from generator 14 (being now driven by engine 10).

As shown in FIG. 4, battery 19 is disposed with a number of accessories 49 connected thereacross in parellel. Whenever generator 14 is activated, it serves to maintain the charge in battery 19 while operating accessories as indicated by box 49. Thus, a circuit traced from the positive terminal 51 of battery 19 along leads 52, 53 via a voltage regulator 54, lead 56, generator 14 and returning to the battery along a path defined by lead 57, voltage regulator 54, and continuing along lead 57 to return to the negative terminal 58 of battery 19 via lead 59 provides power from generator 14 to battery 19 and accessories 49.

In addition to the above, means for sensing the level of charge of battery 19 comprises a voltage responsive sensor 61 of known design for electric vehicles called "a battery discharge indicator," coupled across battery 19 by leads 62, 63 in parallel with the accessories, generator and the like.

Sensor 61 is shown coupled to a switch element 61A whereby the normal voltage across battery 19 is sufficient to maintain switch element 61a in an open position. However, as the charge in battery 19 is drained down, the voltage responsive sensor 61 serves to release switch element 61a so as to form an additional circuit via switch element 61a to lead 64, electromagnetic clutch 38 and to ground. It is clear that the minimum charge level of battery 19 must not be below a level sufficient to operate clutch 38.

Accordingly, as clutch 38 is energized, the engine drive via shaft 42 and drive belt 44 will serve to rotate generator 14 to generate electricity for replenishing the charge in battery 19.

At such times (if motor 34 is installed), it is desirable to relieve generator 14 and engine 10 from the friction-windage load of the now-inactive motor 34. Accordingly, electromagnetic clutch 39 is deactivated by providing a connection from lead 64 via lead 66, to an invertor 67 and a lead 68 coupled to clutch 39. Thus the signal for energizing the electromagnetic clutch 38, when inverted, serves to de-energize clutch 39, thereby releasing generator from motor 34.

After the charge on battery 19 has been suitably replenished there will be sufficient charge to activate the voltage responsive sensor 61 thereby opening switch element 61a. The opening of switch element 61a serves to de-energize clutch 38 and via invertor 67 to energize clutch 39 to couple motor 34 to generator 14. Thus coupled together, this motor-generator, 34-14, can be used to recharge battery 19 by connecting motor leads 36 and 37 to an external electric source, such as outlet 86 on FIG. 1.

FIG. 5 shows another embodiment of the invention in which the generator 14 has been eliminated and an additional battery and control provided. While FIGS. 2 and 4 provided automatic switching, the FIG. 5 (and related FIGS. 6 and 7) provide manual switching. FIGS. 5, 6 and 7 can also be automated, similarly to FIGS. 2 and/or 4.

Accordingly, as shown in FIG. 5, a first battery 92 is provided in conjunction with starter 93 and starter switch 94. A dashboard mounted control box 96 includes a single pole, double throw, snap action switch 97 and a voltmeter (or other battery discharge indicator) 98 with indicator (such as a warning light).

An additional battery 99 (or batteries arranged in parallel) is disposed in a circuit as traced from the positive terminal of battery 99, lead 101, box 106, accessories lead 103, switch armature 97 and then returning to the negative side of battery 99 via lead 102. Voltmeter 98 indicates the charge level of this battery as well. The switch 97 permits selection of either battery without current interruption, due to its snap action.

A box identified with reference numeral 106 is diagrammatically representative of the remaining accessory circuits to be operated by battery 99, while 107 pertains to an optional arrangement in which additional recharging means can be provided to be carried by the vehicle, such as thermopile, solar cells, regenerative braking, EGT driven generator, exhaust gas supplied thermoelectric unit, etc. A diode 105 serves to block a path leading directly to ground from the positive terminals of battery 99 through voltmeter 98.

It has been observed from years of electric vehicle operation, that careful comparison of readings taken from voltmeter 98 and the vehicle's odometer will provide a useful forecast of the distance the vehicle can travel on a given battery so as to properly plan a trip with respect to needing recharging or exchange services, or for better manual selection of battery, generator or major accessory usages. In operation, and assuming batteries 92 and 99 to be fully charged at the beginning of a trip, switch armature 97 can be disposed in the B position so as to initially use battery 99. When the discharge warning light or voltmeter 98 indicates that battery 99 has been discharged to a predetermined level, the driver can change switch armature 97 to the A position and thereafter utilize battery 92.

When voltmeter 98 shows that battery 92 is approaching substantial discharge, the driver can then proceed to the nearest battery recharging or exchange station, preferably avoiding any stopping of the engine (since after the engine is stopped there could possibly be insufficient battery power for starting the engine).

FIG. 6 shows another embodiment of the invention in which a generator can be manually switched on, for emergency use, or for long trips. FIG. 6 corresponds substantially to FIG. 5, but uses only one battery 92. Coil 14 represents an optionally-added generator 14, and box 38 represents an electromagnetic clutch for coupling said generator 14 to be driven by drive belt 44 (per FIG. 3). Switch 111 and voltmeter 98 are disposed in the dashboard mounted control panel 96.

Starting the trip with switch 111 normally open, when the charge on battery 92, as measured by the voltmeter 98, approaches a predetermined charge level, the driver can close switch 111 in order to keep battery 92 well charged.

Electromagnetic clutch 38 thus energized serves to couple engine 10 to drive generator 14. Closure of switch 111 energizes clutch 38 via a circuit traced now from the positive terminal of battery 92 along lead 101 through generator 14 to clutch 38. The return circuit is traced from clutch 38 along lead 109 to switch armature 111, now in its closed position. The return circuit continues along lead 112 and lead 113 to the negative terminal of battery 92.

FIG. 7 shows an embodiment of the invention which serves to handle selected heavier accessory loads, such as: air conditioning systems for automobiles, buses and trucks, freezer systems on refrigerator trucks or trailers, concrete mixing drums, dump body hoists, farm equipment requiring power and towed by tractors (such as harvesters, etc.). While the description below pertains to an air conditioning compressor drive, this embodiment can be applied to any accessory load in order to relieve that load from the heat engine. It then places such load as an electric load, upon an electric storage battery carried by the vehicle, or a unit towed by it, but recharged by external electric sources. Or, it places this electric load directly upon an external electric source, in either case relieving it as a load upon the heat engine 10.

FIG. 7 corresponds substantially to the embodiments shown in FIGS. 5 and 6, but uses only one battery 92 and no generator.

This embodiment provides an air conditioner compressor electric motor represented by the coil 114, an electromagnetic clutch or other enabling means 116 serving to couple the air conditioner compressor to the engine 10 drive, and a dashboard mounted control panel 96, containing a voltmeter 98 and a selector switch 117 (for coupling air conditioner drive signals from line 118 to points C or D, for respectively coupling the air conditioner compressor to be driven by the engine 10, or to operate electric motor 114 to provide the compressor operation).

Thus, switch 117 serves to permit the selection of either the engine 10 drive, by operating the enabling means 116 (such as an electromagnetic clutch), or selecting the electric drive motor 114, with either drive based upon signals from imput 118 from the air conditioner control unit.

In operation, switch 117 will initially be in the D position so that air conditioning signals from line 118 can control the operation of the electric motor 114 driving the compressor.

When voltmeter 98 shows that battery 92 is approaching a predetermined lower level of discharge, a driver can then shift switch 117 to the C position thereby "enabling" the electromagnetic clutch 116 to couple the load of the compressor to the engine, whenever so signalled by 118.

The embodiments shown in any of FIGS. 1 thru 7 can be combined, and each embodiment thereof can be controlled either manually or automatically, as desired. FIG. 8 shows a combination embodiment of FIGS. 5, 6 and 7, thus providing dual batteries, generator option and selected necessary drive options. Like reference numerals have been applied.

Although certain circuits and elements have been described, it is intended to cover equivalent elements. For example, solenoid operated, electronic, hydraulic or pneumatic switches or circuits may be used. The electromagnetic clutches shown can alternatively be removable belts, or mechanical couplings with removable drive pins or keys, to permit manual coupling or decoupling.

In summarizing all of the foregoing, it should be apparent that the present invention is especially suitable for use in a particular type of vehicle, specifically a land automotive vehicle, e.g. a car, bus or truck, which utilizes an internal or external combustion (heat) engine, a turbine engine (also referred to as a heat turbine) or the like for supplying its entire drive force or at least its entire forward drive force. Also, this land automotive vehicle does not include just any car, bus or truck but specifically a car, bus or truck or other such vehicle having its own powered accessories including ones which use rotating power as well as other non-rotating electrically powered accessories. Moreover, these accessories are not just any accessories but specifically of the type which if operated together by direct power supplied mechanically, hydraulically or pneumatically by the engine or indirectly electrically through a generator driven by the engine would require in total at least 5 horsepower, assuming that the vehicle is driven under the conditions of the 1982 Society of Automotive Engineers (SAE) 55 miles/hour Intersate Driving Cycle, and assuming that all of the accessories are operating. In other words, the vehicle which most benefits from the present invention is one which uses a significant amount of power for its accessories including specifically rotary power in the case of some accessories. Thus, vehicles such as power boats, lawn tractors, antique cars and even racing cars do not fall into this category since they do not typically include such a very significant power consuming accessory package. A preferred embodiment of this invention provides for even greater benefits, increasing the accessory load to a 10 horsepower minimum. A summary of the SAE driving cycle conditions may be found in the AiResearch study to be cited below.

With the above-described highly accessorized vehicle in mind, the present invention is directed to an improvement to this vehicle which results in the reduction of fuel consumption, the reduction of generation of pollutants and the general improvement in performance of a vehicle of this type. As a first step in this improvement, substantially all rotary powered accessories including the generator which could be mechanically driven by the engine directly, or indirectly through a generator powered by the engine, are not provided, whereby at most a minimal amount of engine power is required for driving the remaining rotary accessories. If the vehicle is a new one it could be manufactured without these accessories driven by the engine, and if it is an existing vehicle which has been manufactured with such accessories, they could be removed. These accessories typically include a radiator or engine or turbine cooling fan, certain engine or turbine pumps, including water, fuel and emission air pumps, power steering pump, power brake pump and air conditioning compressor. Such a rotary powered accessory, as a lubricating oil pump, which requires minimal engine power but which may be relatively difficult or at least impractical to power other than mechanically directly from the engine may be used since it requires "at most a minimal amount of engine power".

As a second step in the present improvement, all of the powered accessories included by the vehicle, except possibly for the oil pump just mentioned or other such rotating accessories which together require an insignificant amount of power from the engine, are provided as electrically powered accessories, at least some of which are rotary powered electrically and therefore include their own electric motors (or use common motors). All of these accessories are powered by means of an externally chargable electric battery (or an arrangement of batteries) so long as the battery is sufficiently charged, whereby the vehicle's accessories use at most a minimal amount of power from the vehicle's engine or turbine. The battery is normally maintained in a charged state by stationary sources of electricity substantially independent of the operation of the engine or turbine, for example by means of electricity from a public utility. In other words, so long as the battery is sufficiently charged there is substantially no mechanical power taken from the engine, either directly or through a generator driven by the engine, for powering accessories.

As will be discussed in more detail hereinafter, applicant has found that by providing the improvement just described in the particular type of vehicle just described, the petroleum fuel savings, the reduction of pollutants generated and the increased vehicle performance are quite dramatic. At the same time, applicant is quite aware that the same dramatic results are not achieved with respect to vehicles which are not highly accessorized. Two such vehicles are illustrated in U.S. Pat. Nos. 1,662,723 and 2,019,476. In each of these patents, a vehicle driven by an internal combustion engine is disclosed along with the combination of a radiator fan and a water pump powered by means of a battery. In both of these patents, even if it is assumed for argument's sake that the vehicles disclosed there include their fan and water pump as the sole accessories (which is not clear) and assuming further that these accessories are powered solely by externally chargable electrical batteries (which is also not entirely clear), these are not the types of vehicles contemplated by the present invention because they are not ones which meet the accessory power minimum requirements described above. More specifically, neither of these vehicles has powered accessories including ones which use rotating power as well as other which use non-rotating electrically powered accessories and specifically accessories of the type which if operated together by direct power supplied mechanically, hydraulically or pneumatically by the engine, or indirectly electrically through a generator, would require a total of at least 5 horsepower, assuming the vehicle is driven under the 1982 Society of Automotive Engineers (SAE) 55 miles/hour Interstate Driving Cycle conditions and assuming that all of the accessories are operating. Because the SAE 55 MPH Cycle provides the maximum accessory load of any driving cycle which can be readily tested on a U.S. interstate highway, it is used as the most equitable standard test for this power minimum requirement. It is also a test which can be verified by any vehicle owner readily with minimum test equipment and only semi-skilled driving.

A car radiator fan and water pump together, driven under such SAE 55 miles/hour Interstate Driving Cycle conditions, would require in total at most about 1 horsepower. Thus this invention would produce at least five times the power (plus fuel and pollutant) savings of these such fan/water pump "electrification" patents. Still other combination radiator fan/water pump arrangements are described in U.S. Pat. Nos. 3,853,098; 3,894,521; and 4,215,658. While these patents are directed to modern day vehicles, there is no suggestion that all of the powered accessories be driven by an externally chargable electric battery or network of batteries.

From the discussions which just followed, it should be apparent that the vehicle contemplated by the present invention is one which includes a relatively large "all electric" accessory package but which nevertheless derives all of its forward drive force from a heat engine or turbine or the like. This is to be contrasted with Electric vehicles in which all of the drive force is supplied by means of an electric motor, or contrasted with Hybrid vehicles, in which the drive force is supplied by means of both an electric motor and a heat engine or turbine. Both these Electric and Hybrid vehicles generally use electric motorized rotating accessories powered by externally chargable batteries. However, the Electric vehicle, driven by electric motors, has never provided performance plus range at all equal to the heat engine or turbine car. The Hybrid vehicle has improved such performance/range somewhat, but with resultant increases in both vehicle complexity and costs, and in energy use and costs. This invention brings some of the reduced petroleum usage and lesser pollutant generation of the Electrics and Hybrids, plus much greater performance/range than either of them. It outdoes today's heat engine or turbine vehicles in all four fields of fuel economy, pollutant reduction, performance increase and range increase.

The present invention should also be contrasted with the conceptual electrical-mechanical drive arrangement described in an AiResearch Manufacturing study carried out by the U.S. Department of Energy and entitled STUDY ON REDUCTION OF AUTOMOTIVE ACCESSORY POWER REQUIREMENTS, SAN-1095-TI, final report, June 1974–June 1978 (work performed under Contract No. EY-76-C-03-1095), dated Oct. 20, 1978. The particular conceptual arrangement just referred to is illustrated in FIGS. 3.1-14 1 on page 3-31. This arrangement contemplates the utilization of an electric fan, an electric water pump, an electric air conditioning compressor and an electrically powered steering system. However, unlike the present invention, these electrical accessories are powered by means of a generator driven by a heat engine or turbine of, or carried by, the vehicle, rather than by means of an externally chargable battery. As indicated above, applicant has found that by powering these electrically motorized accessories by means of a battery alone, fuel consumption and generation of pollutants are substantially reduced, especially in comparison to what could be achieved by an arrangement of the type illustrated in FIGS. 3.1-14. And yet, even though the study just recited covered many years and apparently required a large degree of technical expertise and, in any case, was quite extensive in its evaluation of automotive accessory power requirements, there is no suggestion in this study of applicant's approach which is to power all of the electric accessories by means of the battery alone, so long as the latter is sufficiently charged.

While the present invention contemplates deriving its most substantial benefits by providing a land automotive vehicle having a relatively large electrical accessory package described and by operating the accessories from a rechargable battery, the present invention also contemplates backup and range extension systems using either additional batteries or an engine powered electrical generator as described previously. Thus, the improved vehicle disclosed herein is one which may include additional batteries or a mechanically powered electrical generator which is driven by the vehicle's engine to produce electricity for powering the accessories. However, in order to preserve the benefits of the present invention, this system is only resorted to in the event that the battery itself falls below a predetermined charge level or in the event the driver contemplates a sufficiently longer trip than would be possible by means of the battery alone, in which case the driver may contemplate saving the battery for use upon arriving at his ultimate destination. However, for city driving or local highway driving, the present invention contemplates utilizing the battery alone. At the same time, the present invention provides means for enabling the generator for providing electrical power in the event the battery falls below a predetermined level and means for disabling it after the battery has been sufficiently charged. For example, readily providable means can be provided for sensing the charge level of the battery in combination with a switch (between the generator and, for example, a common bus connecting it to the accessories). At the same time, a clutch arrangement may be made responsive to the same sensing means so that so long as the battery is sufficiently charged, the switch remains open and the clutch remains disengaged, thereby isolating the generator electrically from the bus and mechanically from the engine.

Should the battery fall below the desired level, the sensing means would automatically close the switch and engage the clutch, thereby causing the engine to drive the generator for producing electricity which would be applied to the bus for operating the accessories and, at the same time the electricity could be used to begin charging the battery.

Still another feature of the present improvement resides in the particular way in which the battery itself is recharged. As discussed previously, it can be charged from a power supply remote to the vehicle such as a public utility through a cooperating receptacle and recharging means. Additionally, it can be recharged on board, that is, from the vehicle itself per reference numeral 107 on FIGS. 5, 6, 7 and 8, by means totally independent of the engine such as the solar cell electric system described previously. Other on board recharging means described previously included a regenerative braking system and/or an EGT driven generator as well as an exhaust gas heated thermal electric unit. Still another on board recharging approach would be to use a fuel cell. This type of device is well known in the art having been invented by Grove in 1839, and produces electricity by utilizing a fuel and an oxidizer whose combination is controlled by a catalyst.

Having summarized the present invention and it various improvements, attention is now directed to an analytical evaluation of these improvements from practical standpoints using as a primary reference the above cited AiResearch study.

The following discussion is being provided to demonstrate the major effects of the present invention's transfer of accessory power from petroleum to electricity in terms of:

Annual fuel savings per car;
Annual energy cost savings per car;
Sixth year onward: Annual reductions in U.S. petroleum imports;
Sixth year onward: Annual improvement in U.S. balance of trade;
Sixth year onward: Annual increased sales of U.S. electric power;
Reductions in generation of vehicle pollutants; and
Improvement in vehicle power, performance and range.

The following calculations which will be provided as part of these discussions are based on the proposed use of this invention from its initial major installations in American vehicles until "maturity" of such an installation program some six years later. It is based upon such installations on the 5,000,000 large cars, and 2,000,000 trucks and buses, manufactured each year in the United States, plus the retroactive installations each year on an equal number of such previously manufactured American vehicles. Omitted are smaller cars and those large cars which may lack convenient recharging facilities (per Wm. Hamilton's book "The Electric Automobile", 1980 by McGraw-Hill Book Co.).

The vehicle use is based on U.S. Federal vehicle schedules of 15,000 miles annually, divided into City driving cycle of 55% (8,250 miles) at 20 mph average and Highway driving cycle of 45% (6,750 miles) at 50 mph. A battery capacity of two hours is provided, giving a City battery range of 40 miles and a Highway battery range of 100 miles, e.g., a sufficient range for nearly all driving, except for occasional long highway trips. For these latter trips, the vehicle electricity can be provided by an engine driven alternator, through "enabling means", instead of by battery, as discussed previously. On all cycles, air conditioning is used 50% of the time. For the following calculations, 1,000 miles of the Highway cycle (of 6,750 miles) will be assumed as such "longer" trips, leaving 5,750 for basic Highway cycle computations.

For statistical comparison, the previously recited "Study on Reduction of Automotive Accessory Power Requirements SAN-1095" by AiResearch Mfg. Co., made under U.S. Department of Energy Contract No. EY-76-C-03-1095, known hereafter as the "AR Study", provides the base. This study was made from June 1974 through June 1978, at a cost of nearly $1,000,000 and is the most thorough such study on automotive accessories now available.

The vehicle used in the AR Study was a 1975 Mustang II hatchback with a 2800 c.c. V6 engine, with the following engine-driven rotating accessories:
Air conditioning compressor
Power steering pump
Alternator
Engine cooling fan
Water pump
Emissions air pump Because of its small size (curb weight of 3,050 pounds), this Mustang would rank as about the smallest of the 5,000,000 "large" cars of these calculations. Thus these calculations conservatively understate the proposed invention's benefits.

FIG. 2-5 of the AR Study shows fuel usage averages of this Mustang at: City—15.2 mpg, the Highway—22.0 mpg, with listed engine-driven accessories and 50% air conditioning usage.

ANNUAL FUEL SAVINGS PER CAR

City cycle—8,250 miles annually—(accessory power by battery). At 15.2 mpg, 543 gallons of gasoline will be used per year, driving at 20 mph average speed, and using air conditioning 50% of the time.

Use of the externally-charged battery for vehicle electric power supply in place of its engine-driven alternator, will provide the basic same fuel economy improvement as that shown in AR Study, Table 2-I (page 26), under the heading "Maximum Theoretical Improvement Assumes Vehicle with No Accessories". These "City cycle" improvement figures for "A/C ON" of 18.4% and "A/C OFF" of 6.9% are averaged, to provide for 50% A/C usage. This 12.6% average improvement results in a 68 gallon savings for battery only, for this City cycle basic use of 543 gallons.

Highway (basic) cycle—5,750 miles annually—(accessory power by battery). At 22.0 mpg, 261 gallons of gasoline will be used per year, driving at 50 mph average and using air conditioning 50% of the time.

Table 2-I, under "No Accessories Highway Cycle", shows figures of 23.4% and 12.6% improvements for "A/C ON" and "A/C OFF", respectively. Averaging these (for 50% A/C) results in an 18.0% fuel improvement, or a 47 gallon saving for battery only, for this highway cycle basic use of 261 gallons.

Highway (long trips) cycle—1,000 miles annual "long trips" (accessory power by engine-driven alternator). At 22.0 mpg, 45 gallons of gasoline will be used here per year, at 50 mph with 50% A/C.

Here the electricity for the accessory motors will be supplied by "enabling" the engine-driven alternator, normally provided for vehicle range extension beyond the two hour battery supply limit. Thus the engine fuel consumption is the same as that of the unmodified Mustang II.

The use in this invention of electric motors for accessory drives will provide the same constant speed fuel economics, the same as does the constant speed mechanical improvement to Table 2-I. Thus, its fuel improvement figures of 7.8% and 5.2% are averaged for a 6.5% improvement, or a 3 gallon savings for this 1,000 miles Highway (long trips) cycle use of 45 gallons.

To recapitulate these figures, reference is made to Table I below:

TABLE I

| Cycle | Miles | Electricity Supply | Basic Fuel Use | Savings |
|---|---|---|---|---|
| City | 8,250 | Battery | 543 gallons | 68 gallons |
| Highway | 5,750 | Battery | 261 gallons | 47 gallons |
| Highway - long trips | 1,000 | Engine-driven Alternator | 45 gallons | 3 gallons |
| Composite Totals: | | | 849 gallons | 118 gallons |

This 118 gallons savings provides a 13.9% composite improvement over the prior 849 gallons basic use, as compared with the non-accessory "Maximum Theoretical Improvement Composite" average of 15.2% of Table 2-I of the AR Study. This invention will thus attain fuel savings of 91.4% of this Maximum target.

Some degradation of this savings may occur early on lighter cars, due to present battery weight, until improved lighter batteries (or fuel cells) are developed. However such degradation will be insignificant on heavier cars, trucks and buses. On such large diesel trucks and buses, averaging 60,000 miles annually and having two to three times a car's accessory loads, fuel savings of over 1,000 gallons per year may result.

Comparing this invention's composite fuel improvement of 13.9% with the 4.8% improvement of the AR Study Constant Speed Drive (CSD) shows that this invention will provide nearly three (3) times the fuel savings of the AR CSD, further emphasizing the benefits of its approach to the "electrification of accessories".

ANNUAL ENERGY COST SAVINGS PER CAR

At $1.50 per gallon (1982 prices), the 118 gallon savings will total $177 annually. Directly offsetting this savings is the cost of electricity used for the 8,250 mile City basic cycle and for the 5,750 mile Highway basic cycle battery recharging.

Based on 2 KW per hour net battery charging times 2 hours per day, times 350 days, an annual usage of 1,400 KW hours results. A "charging means" loss factor of 25% increases this to a gross usage of 1,870 KW hours. If recharged at night, "off-peak" rates of 5¢ per KW hour (1982 prices) provide an annual electricity cost of $94 (or 53% of the $177 gasoline savings). Subtracting this $94 from the $177, leaves a net annual energy cost savings per car of $83, or 47% of the prior petroleum annual costs.

Large diesel trucks and buses travel four times the usual 15,000 miles annually, with larger and more accessories using two to three times a car's accessory power. Combined with gasoline and smaller trucks, their unit savings will average 2.5 times that of a car, for $200 annual averages, going up to nearly $1,000 for large diesel units.

SIXTH YEAR ONWARD: ANNUAL REDUCTION IN U.S. PETROLEUM IMPORTS

The 118 gallons of gasoline annual savings converts at 42 gallons per barrel to 2.8 barrels per car per year. Because refineries produce only 50% gasoline from each barrel of petroleum (crude oil), 5.6 barrels thereof are required per car per year. Trucks and buses will require 2.5 times as much, or 14.0 barrels of petroleum each per year, allowing for additional recovery of diesel oil from the 50% petroleum remaining after gasoline recovery.

Assume that this invention is eventually installed in the U.S. annually on 5,000,000 larger cars, and on 2,000,000 trucks and buses, and retroactively on a similar 5,000,000 larger recent cars and 2,000,000 recent trucks and buses for a six year period. After six years, it is presumed that older vehicles with this invention will be phasing out at about the production rate of new vehicles with such installations. Until such a six year "maturity" point is reached, U.S. petroleum annual imports will be reduced in accordance with Table II below.

TABLE II

Added Reductions for Each Year

| | |
|---|---|
| New Cars: | 5,000,000 × 5.6 barrels/yr = 28,000,000 bl/yr |
| New Trucks/Buses: | 2,000,000 × 14.0 barrels/yr = 28,000,000 bl/yr |
| Retroactive Cars: | 5,000,000 × 5.6 barrels/yr = 28,000,000 bl/yr |
| Retro Trucks/Buses: | 2,000,000 × 14.0 barrels/yr = 28,000,000 bl/yr |
| Annual Added U.S. Petroleum Reductions: | 112,000,000 bl/yr |

Total of sixth year, and thereafter annual reductions = 112 MB/yr × 6 × 672,000,000 bl/yr or 1.84 million barrels per day (MBD). This significant reduction in U.S. petroleum imports will greatly reduce our "oil import hazard".

SIXTH YEAR ONWARD: ANNUAL IMPROVEMENT IN U.S. BALANCE OF TRADE

This 672,000,000 barrels per year oil import reduction will improve our trade balance by over $20,000,000,000 annually, at 1982 prices of $30 per barrel of petroleum.

SIXTH YEAR ONWARD: ANNUAL INCREASED SALE OF U.S. ELECTRIC POWER

At the sixth year, and thereafter, of both new and retroactive installations of this invention, electricity sales at $94 per car per year (trucks × 2.5) will increase to:

(60,000,000 cars × $94) + (24,000,000 trucks/buses × 2.5 factor × $94) = $11,280,000,000 annually, at 1982 "off-peak" electricity rates of 5¢ per KW hour.

As shown in the previously cited Hamilton book, "Electric Automobile" and other studies, this "off-peak" supply of electricity is now available with no further expansion expense for U.S. power plants. Thus these "off-peak" rates primarily represent additional power plant fuel cost, but no capital costs.

REDUCTION IN GENERATION OF VEHICLE POLLUTANTS

FIG. 1-1 of the AR Study shows "accessory drive benefits" for its Constant Speed Drive. The 4–10%

"improved fuel economy" is closely matched by a 5%–8% "improved emissions".

Accordingly, this invention's 13.9% composite improved fuel economy will result in the generation of a like percentage of overall reduced emissions. The exact percentage reduction of the emission for each pollutant (of the overall reduction) will vary, as shown by FIG. 2-12 of the AR Study, dependent upon the vehicle's emission control system, operation load, environment, etc.

Such reductions will particularly benefit our atmosphere for both new and retroactive installations on trucks, buses and older vehicles which have no, or inadequate, emission control systems. Also, present such control systems do not eliminate either lead or particulate emissions which here will be reduced the same as fuel, or 13.9% for the composite average.

IMPROVEMENT IN VEHICLE POWER, PERFORMANCE AND RANGE

Table 2-II of the AR Study lists the energy (power) BTU's required for the same Mustang's operation (City and Highway Cycles) shown in Table 2-I on page 27. A similar table to the latter 2-I, but using BTU values from 2-II, is shown below.

$83, or 47% of the prior fuel annual cost. (At 1982 prices of $1.50 per gallon for gasoline, and 5¢ per KWHr for "off-peak" electricity).

Sixth year onward: Annual Reduction in U.S. Petroleum Imports:

Sixth year (and thereafter): 1.84 million barrels per day (MBD).

Sixth year onward: Annual Improvement in U.S. Balance of Trade:

Sixth year (and thereafter): $20,000,000,000 per year (At 1982 prices of $30 per barrel).

Sixth year onward: Annual Increased Sales of U.S. Electric Power:

Sixth year (and thereafter) $11,280,000,000 per year (At 1982 prices of 5¢ per KWHr for "off-peak" electricity).

Reductions in Generation of Vehicle Pollutants:

Reductions of HC, CO and $NO_x$ will approximate 13.9%, similar to fuel economy improvement. Additionally, lead and particulate emissions are not eliminated with present emission controls, but here will also be reduced 13.9% approximately.

Improvements in Vehicle Power, Performance and Range:

By increasing net engine power 25.7%, improve-

| | Power (in BTU's) Improvement | | | |
|---|---|---|---|---|
| | City Cycle | | Highway Cycle | |
| | A/C ON | A/C OFF | A/C ON | A/C OFF |
| 1 Engine Shaft BTU's | 14,634 | 11,281 | 16,035 | 13,760 |
| 2 Accessories BTU's | 5,863 | 2,222 | 5,154 | 2,811 |
| 3 = 1 + 2 Engine Power BTU's | 20,497 | 13,503 | 21,189 | 16,571 |
| 4 = 2/1 Max. Power Improvement - No Accessories | 40.0% | 19.7% | 32.1% | 20.4% |
| Maximum Theoretical Improvement - assumes Vehicle with No Accessories | Composite 28.1% | | | |

These earlier calculations showed that this invention, using No Accessories (except generator for 1,000 miles Highway), would save 91.4% of the "Maximum for Fuel Economy Improvement" target. Based thereon, a similar power improvement annually will result for this Mustang of 91.4% × 28.1% = 25.7%.

Such a major 25.7% composite increase in power will markedly increase the vehicle's performance in speed, acceleration, hill-climbing and load carrying (the latter two are particularly important for trucks and buses).

Manufacturers, seeking an even greater fuel economy and/or reduction in emissions in a vehicle, may now elect to "downsize" its engine. This also will reduce the vehicle's cost and weight, while still retaining its performance prior to this invention's installation.

While "range" is not generally classified under "performance", it should be noted that the 13.9% composite fuel economy shown above for this invention's installation on the Mustang, will improve its range accordingly.

SUMMARY

The following is a summary of the foregoing calculations regarding the above-described Mustang II.

Annual Fuel Savings Per Car:

118 gallons, due to a 13.9% composite improvement in fuel ecomomy, attaining 91.4% of the AR Study "Maximum" target.

Annual Energy Cost Savings Per Car:

ments will result in speed, acceleration, hill climbing and load carrying. Such improvements may permit engine "down-sizing" while returning prior vehicle performance, but decreasing vehicle weight, cost and fuel economy (further).

Vehicle range will be extended, similar to the 13.9% improvement in fuel economy.

While the above calculations are based on this AR Study of one Mustang, independent tests by applicant have indicated they are reasonable.

What is claimed is:

1. In a land automotive vehicle utilizing a heat engine or a heat turbine or the like for supplying its entire forward drive force and having its own powered accessories including ones which use rotating power as well as other non-rotating electrically powered accessories, said accessories being specifically of the type which if operated together by power supplied mechanically, hydraulically or pneumatically by the engine or turbine and/or indirectly electrically by the engine or turbine through a generator, would require in total at least 5 horse power, assuming the vehicle is driven in accordance with the 1982 SAE 55 miles/hour Interstate Driving Cycle conditions, and assuming that all of the accessories are operating, at full load, the improvement comprising: substantially eliminating from said vehicle at least most of the rotary powered accessories which are driven by said engine or turbine directly or indirectly such that at most a minimal amount of engine or turbine power is required for driving any remaining accessories; and including in said vehicle all of said eliminated accessories as electrically powered accessories, at least some of which are rotary powered electrically and therefore include their own electric motor means, and means including externally chargable electrical battery means carried by said vehicle, or by a unit towed by it, normally maintained in a charged state by charging means supplied by stationary sources of electricity substantially independent of the mechanical load on said engine or turbine, said battery means being coupled with substantially all of said electrically powered accessories for operating the latter without using any mechanical power from said engine or turbine, either directly or through a generator driven by the engine or turbine, so long as the battery means is sufficiently charged, such that the engine or turbine uses at most a minimal amount of its power for accessories and thereby displays reduced fuel consumption, reduced generation of pollutants and improved vehicle performance, said vehicle being provided with means including a mechanically powered electrical generator for electrically powering said electrically powered accessories from mechanical power supplied by said engine or turbine in the event said battery means falls below a predetermined charge level, said means including said generator also including means for enabling said generator for providing electrical power to said accessories and for disabling the generator.

2. The improvement according to claim 1 wherein said rotary electrically powered accessories include a radiator or engine or turbine cooling fan, certain engine or turbine pumps including water, fuel and emission air pumps, power steering pump, power brake pump and air conditioning compressor pump.

3. The improvement according to claim 1 wherein said enabling and disabling means includes means responsive to the charge level of said battery means for automatically placing said generator in its enabled state from its disabled state in the event said battery means falls below said predetermined charge level and for automatically placing such generator back in its disabled state when such battery means is charged back up to a predetermined higher level.

4. The improvement according to claim 1 wherein said enabling and disabling means includes means for mechanically engaging said generator with and disengaging it from said engine or turbine and electrical switch means for electrically connecting said generator to and disconnecting it from said accessories and battery means.

5. The improvement according to claim 1 wherein said vehicle includes specifically an engine or turbine electric starter means and vehicle headlights as part of said electrical accessories, said improvement including the addition of a secondary battery means for powering said electric starter means and said headlights.

6. The improvement according to claim 1 wherein said battery means includes first and second batteries and wherein said means including said battery means also includes means for coupling said first battery means to operate said electrically powered accessories until said first battery means has been discharged to a predetermined level, means for sensing the discharge level of said first battery and means responsive to the last-named means for manually at any time decoupling the first battery from said accessories and coupling the second battery to the accessories to operate the latter, said decoupling and coupling means also including means for automatically decoupling said first battery and coupling said second battery when said first battery falls to said predetermined charge level.

7. The improvement according to claim 1 wherein said means including said battery means also includes means carried by said vehicle for charging said battery means from external electric or solar sources.

8. The improvement according to claim 1 wherein said stationary sources of electricity includes an electric utility and wherein said means including said battery means also includes means for charging said battery means from said utility.

9. The improvement according to claim 1 wherein said means including said battery means includes means carried by said vehicle but independent of said engine or turbine mechanical load for charging said battery means.

10. The improvement according to claim 9 wherein said independent charging means is supplied with electricity from one or more sources selected from the group consisting of a fuel cell, a solar cell, an exhaust gas turbine driven generator, an exhaust gas heated thermal-electric generator and/or an electric regenerative braking system on the vehicle.

11. The improvement according to claim 1 wherein said accessories included in said vehicle are specifically of the type which if operated together by power supplied mechanically, hydraulically or pneumatically by the engine or turbine and/or indirectly electrically by the engine or turbine through a generator, would require at least 10 horsepower assuming the vehicle is driven in accordance with the 1982 SAE 55 mile/hour Interstate Driving Cycle conditions, and assuming that all of the accessories are operating at full load.

12. A method of reducing fuel consumption, reducing generation of pollutants and improving performance of a land automotive vehicle utilizing a heat engine or a heat turbine or the like for supplying its entire forward drive force and specifically of the type having its own powered accessories including ones which use rotating power as well as other nonrotating electrically powered accessories, said accessories being specifically of the type which, if operated together by direct power supplied mechanically, hydraulically or pneumatically by the engine or turbine and/or indirectly electrically by the engine or turbine through a generator, would require in total at least 5 horsepower assuming the vehicle is driven in accordance with the 1982 SAE 55 miles/hour Interstate Driving Cycle conditions and assuming that all of the accessories are operating, said method comprising the steps of: utilizing at most a minimal amount of engine or turbine power for driving accessories by substantially eliminating from said vehicle most of those accessories which are mechanically, hydraulically or pneumatically driven by said engine or turbine directly or indirectly electrically by the engine or turbine through a generator providing said vehicle with all of said eliminated accessories as electrically powered accessories, at least some of which are rotary powered electrically and therefore include their own or shared electric motor means; powering said electrically powered accessories only by means of an externally chargable electrical battery means carried by said vehicle or by a unit towed by it without using mechanical power from the engine or turbine, either directly or electrically through a generator driven by the engine, so long as said battery means is sufficiently charged; and charging said battery means from a charging means supplied by electricity from a source external to said vehicle, at least some of said electrically motorized accessories correspond in function to accessories which have heretofore been only mechanically driven by the engine or turbine directly, said method including the additional step in said vehicle of selectively powering such accessories either by said electric motor means or mechanically by the engine or turbine directly.

13. The method according to claim 12 including the steps of providing said vehicle with an electrical generator powered by said engine or turbine and using said generator for electrically powering said accessories from mechanical power supplied by said engine or turbine in the event said battery means falls below a predetermined charge level.

14. The method according to claim 13 including the steps of monitoring the charge level of said battery means for automatically powering said accessories by means of said generator in the event said battery means falls below said predetermined charge level.

15. The method according to claim 12 wherein said vehicle is provided with first and second batteries, said method including the steps of initially powering said accessories using said first battery, monitoring the charge level of said first battery, and in the event the charge level of said first battery falls below a predetermined level automatically replacing said first battery with said second battery so that the latter powers said accessories until said first battery is recharged to a higher level.

16. The method according to claim 12 including the step of charging said battery means from a charging means supplied with electricity from a source carried by said vehicle but imposing no mechanical load on said engine or turbine.

17. The method according to claim 16 wherein said charging means is supplied with electricity from one or more sources carried by said vehicle, selected from the group consisting of a fuel cell, a solar cell, an exhaust gas turbine driven generator, an exhaust gas heated thermo-electric generator and/or an electric regenerative braking system on the vehicle.

18. The method according to claim 12 wherein said accessories included in said vehicle are specifically of the type which if operated together by power supplied mechanically, hydraulically or pneumatically by the engine or turbine and/or indirectly electrically by the engine or turbine through a generator, would require at least 10 horsepower assuming the vehicle is driven in accordance with the 1982 SAE 55 miles/hour Interstate Driving Cycle conditions, and assuming that all of the accessories are operating at full load.

19. In an automotive vehicle utilizing a heat engine or heat turbine for supplying entire its forward drive force and having electrically powered accessories, rechargable battery means connected with said accessories and capable of powering the latter so long as the battery means is sufficiently charged and mechanically driven generator means, the improvement comprising: means movable between a first operating condition for maintaining said generator means out of mechanical engagement with said engine or turbine in order to disable said generator and allow said battery means to power said accessories and a second operating condition for maintaining said generator means in mechanical engagement with said engine or turbine whereby to enable the generator means and, at the same time, in electrical engagement with said accessories and/or said battery means in order to power said accessories and/or to change said battery means by the enabled generator means; and means for indiscriminately placing said movable means in either its first or second operating condition at the discretion of vehicle's operator.

20. The improvement according to claim 19 wherein said means for placing said movable means in either its first or second position includes a manual switch movable between corresponding first and second positions.

21. The improvement according to claim 19 including means for automatically moving said movable means from its first operating condition to its second operating condition in the event said battery means falls below a sufficiently charged level.

22. The improvement according to claim 19 including electrical motor means having its own drive shaft and adapted to be powered by a source of electricity external of said vehicle, means for disengagably connecting the drive shaft of said electrical motor means with said generator means when the latter is out of engagement with said engine or turbine and means for maintaining said generator means in electrical engagement with said battery means when the drive shaft of said motor means is disengagably connected with said generator means, whereby to cause said motor means to drive said generator for charging said battery means.

23. In an automotive vehicle utilizing a heat engine or a heat turbine or the like for supplying entire its forward drive force and having its own powered accessories including ones which use rotating power as well as other non-rotating electrically powered accessories, rechargable battery means connected with said electric powered accessories and capable of powering the latter so long as the battery means is sufficiently charged and mechanically driven generator means, the improvement comprising: substantially eliminating from said vehicle at least most of the rotary powered accessories which are driven by said engine or turbine directly or indirectly such that at most a minimal amount of engine or turbine power is required for driving any remaining accessories; and including in said vehicle all of said eliminated accessories as electrically powered accessories, at least some of which are rotary powered electrically and therefore include their own electric motor means, means movable between a first operating condition for maintaining said generator means out of mechanical engagement with said engine or turbine in order to disable said generator and allow said battery means to power said accessories and a second operating condition for maintaining said generator means in mechanical engagement with said engine or turbine whereby to enable the generator means and, at the same time, in electrical engagement with said accessories and/or said battery means in order to power said accessories and/or charge said battery means by the enabled generator means, and including a manually actuatable switch for indiscriminately placing said movable means in either its first or second operating condition at the discretion of vehicle's operator.

24. The improvement according to claim 23 including electrical motor means having its own drive shaft and adapted to be powered by a source of electricity external of said vehicle, means for disengagably connecting the drive shaft of said electrical motor means with said generator means when the latter is out of engagement with said engine or turbine and means for maintaining said generator means in electrical engagement with said battery means when the drive shaft of said motor means is disengagably connected with said generator means, whereby to cause said motor means to drive said generator for charging said battery means.

25. In an automotive vehicle utilizing a heat engine or a heat turbine for supplying entire its forward drive force and having electrically powered accessories, rechargable battery means connected with said accessories and capable of powering the latter so long as the battery means is sufficiently charged and mechanically driven generator means, the improvement comprising: means movable between a first operating condition for maintaining said generator means out of mechanical engagement with said engine or turbine in order to disable said generator and allow said battery means to power said accessories and a second operating condition for maintaining said generator means in mechanical engagement with said engine or turbine whereby to enable the generator means and, at the same time, in electrical engagement with said accessories and/or said battery means in order to power said accessories and/or to charge said battery means by the enabled generator means; electrical motor means having its own drive shaft and adapted to be powered by a source of electricity external of said vehicle, means for disengagably connecting the drive shaft of said electrical motor means with said generator means when the latter is out of engagement with said engine or turbine and means for maintaining said generator means in electrical engagement with said battery means when the drive shaft of said motor means is disengagably connected with said generator means, whereby to cause said motor means to drive said generator for charging said battery means.

26. In an automotive vehicle utilizing a heat engine or a heat turbine for supplying entire its forward drive force and having electrically powered accessories, rechargable battery means connected with said accessories and capable of powering the latter so long as the battery means is sufficiently charged and means including a mechanically driven generator for powering said accessories and/or charging said battery means through mechanical engagement with said engine or turbine or for remaining out of engagement with said engine or turbine, the improvement comprising: electrical motor means having its own drive shaft and adapted to be powered by a source of electricity external of said vehicle, means for disengagably connecting the drive shaft of said electrical motor means with said generator when the latter is out of engagement with said engine or turbine and means for maintaining said generator in electrical engagement with said battery means when the drive shaft of said motor means is disengagably connected with said generator, whereby to cause said motor means to drive said generator for charging said battery means.

27. In a land automotive vehicle utilizing a heat engine or a heat turbine or the like for supplying its entire forward drive force and having its own powered accessories including ones which use rotating power as well as other non-rotating electrically powered accessories, said accessories being specifically of the type which if operated together by power supplied mechanically, hydraulically or pneumatically by the engine or turbine and/or indirectly electrically by the engine or turbine through a generator, would require in total at least 5 horsepower, assuming the vehicle is driven in accordance with the 1982 SAE 55 miles/hour Interstate Driving Cycle conditions, and assuming the vehicle is driven in accordance with the 1982 SAE 55 miles/hour Interstate Driving Cycle conditions, and assuming that all of the accessories are operating, at full load, the improvement comprising: substantially eliminating from said vehicle at least most of the rotary powered accessories which are driven by said engine or turbine directly or indirectly such that at most a minimal amount of engine or turbine power is required for driving any remaining accessories; and including in said vehicle all of said eliminated accessories as electrically powered accessories, at least some of which are rotary powered electrically and therefore include their own electric motor means, and means including externally chargable electrical battery means carried by said vehicle, or by a unit towed by it, normally maintained in a charged state by charging means supplied by stationary sources of electricity substantially independent of the mechanical load on said engine or turbine, said battery means being coupled with substantially all of said electrically powered accessories for operating the latter without using any mechanical power from said engine or turbine, either directly or through a generator driven by the engine or turbine, so long as the battery means is sufficiently charged, such that the engine or turbine uses at most a minimal amount of its power for accessories and thereby displays reduced fuel consumption, reduced generation of pollutants and improved vehicle performance, at least some of said electrically motorized accessories corresponding in function to accessories which have theretofore been only mechanically driven by the engine or turbine directly, said improvement including means in said vehicle for selectively powering such accessories either by said electric motor means or mechanically by the engine or turbine directly.

* * * * *